(12) United States Patent
Han (10) Patent No.: US 10,341,805 B2
(45) Date of Patent: Jul. 2, 2019

(54) METHOD OF DISPLAYING CONTENTS BY USING DEVICE IDENTIFIER OF WIRELESS COMMUNICATION DEVICE

(71) Applicant: Min Gyu Han, Seoul (KR)

(72) Inventor: Min Gyu Han, Seoul (KR)

(*) Notice: Subject to any disclaimer, the term of this patent is extended or adjusted under 35 U.S.C. 154(b) by 0 days.

(21) Appl. No.: 14/356,100

(22) PCT Filed: Nov. 2, 2012

(86) PCT No.: PCT/KR2012/009192
§ 371 (c)(1),
(2) Date: May 2, 2014

(87) PCT Pub. No.: WO2013/066111
PCT Pub. Date: May 10, 2013

(65) Prior Publication Data
US 2014/0308937 A1 Oct. 16, 2014

(30) Foreign Application Priority Data
Nov. 3, 2011 (KR) .......... 10-2011-0113888

(51) Int. Cl.
*H04W 4/02* (2018.01)
*G06Q 50/10* (2012.01)
*G06Q 30/02* (2012.01)
*H04W 4/21* (2018.01)

(52) U.S. Cl.
CPC .......... *H04W 4/02* (2013.01); *G06Q 30/02* (2013.01); *G06Q 50/10* (2013.01); *H04W 4/023* (2013.01); *H04W 4/21* (2018.02)

(58) Field of Classification Search
CPC ....... H04W 4/008; H04W 4/02; H04W 4/021; H04W 4/023; H04W 4/025; H04W 64/00; G06Q 50/10; G06Q 30/02
USPC .... 455/414.2, 414.3, 456.3, 41.1, 41.2, 41.3
See application file for complete search history.

(56) References Cited

U.S. PATENT DOCUMENTS

| | | | | |
|---|---|---|---|---|
| 7,366,523 B2* | 4/2008 | Viikari | ............... | H04W 4/02 342/357.395 |
| 9,516,468 B2* | 12/2016 | Sugaya | ............... | H04W 4/025 |
| 10,033,683 B2* | 7/2018 | Baca | ............... | G06Q 50/30 |
| 2005/0059416 A1* | 3/2005 | Ono | ............... | H04L 12/14 455/457 |
| 2007/0232221 A1* | 10/2007 | Miyata | ............... | H04H 60/42 455/3.01 |
| 2007/0249367 A1* | 10/2007 | Sato | ............... | G06F 17/3087 455/456.3 |

(Continued)

FOREIGN PATENT DOCUMENTS

| CN | 1860750 A | 11/2006 |
|---|---|---|
| CN | 1993686 | 7/2007 |

(Continued)

*Primary Examiner* — Magdi Elhag
(74) *Attorney, Agent, or Firm* — Rutan & Tucker LLP; Hani Z. Sayed (57) ABSTRACT

The present invention relates to a method of displaying contents by using a device identifier of a wireless communication device, and a method of providing contents. The contents displaying method includes: receiving the device identifier from the wireless communication device if the device is located within a coverage thereof; and receiving and displaying at least one content corresponding to the device identifier from a contents providing system.

7 Claims, 6 Drawing Sheets

(56) References Cited

U.S. PATENT DOCUMENTS

| | | | |
|---|---|---|---|
| 2008/0062940 A1* | 3/2008 | Othmer et al. ............... 370/338 |
| 2008/0097858 A1* | 4/2008 | Vucina .................. G06Q 20/20 |
| | | 705/14.12 |
| 2008/0240016 A1* | 10/2008 | Cai .................... H04L 65/1016 |
| | | 370/328 |
| 2009/0138439 A1* | 5/2009 | Yeung ................. G06F 17/3087 |
| 2010/0056185 A1* | 3/2010 | Lamba ....................... 455/456.6 |
| 2010/0064250 A1* | 3/2010 | Schroeder ............ G06F 3/0485 |
| | | 715/784 |
| 2010/0120450 A1* | 5/2010 | Herz ......................... 455/456.3 |
| 2011/0212686 A1* | 9/2011 | Lee et al. ..................... 455/11.1 |
| 2011/0258303 A1 | 10/2011 | Nath et al. |
| 2012/0109830 A1* | 5/2012 | Vogel ............................. 705/75 |
| 2012/0158991 A1* | 6/2012 | Ajjaguttu et al. ............ 709/238 |

FOREIGN PATENT DOCUMENTS

| | | |
|---|---|---|
| JP | H8-18501 | 1/1996 |
| JP | H11-234421 | 8/1999 |
| JP | 2001-223712 | 8/2001 |
| JP | 2002-236641 | 8/2002 |
| JP | 2002333853 | 11/2002 |
| JP | 2003016347 | 1/2003 |
| JP | 2003134546 | 5/2003 |
| JP | 2004088440 | 3/2004 |
| JP | 2005086770 | 3/2005 |
| JP | 2006-146303 | 6/2006 |
| JP | 2006245906 | 9/2006 |
| JP | 2007163621 | 6/2007 |
| JP | 2008-176780 | 7/2008 |
| JP | 2009065701 | 3/2009 |
| JP | 2009188922 | 8/2009 |
| JP | 2011141784 | 7/2011 |
| JP | 2013016107 | 1/2013 |
| JP | 2014523881 | 3/2014 |
| KR | 10-2002-0014897 | 2/2002 |
| KR | 10-0367566 | 12/2002 |
| KR | 10-0367566 | 1/2003 |
| KR | 10-2008-0019867 | 3/2008 |
| KR | 10-2008-0019867 | 5/2008 |

* cited by examiner

METHOD OF DISPLAYING CONTENTS BY USING DEVICE IDENTIFIER OF WIRELESS COMMUNICATION DEVICE

CROSS REFERENCE TO RELATED APPLICATION

This application is related to and claims priority from the Korea PCT Patent Application No. PCT/KR2012/009192 filed on Feb. 11, 2012, which claims priority to Korea Patent Application No. 10-2011-0113888 filed on Mar. 11, 2011.

TECHNICAL FIELD

The present invention relates to providing content based on identification information of a wireless communication apparatus, and more particularly, to providing, by a user terminal located within a coverage area of a wireless communication apparatus, identification information of the wireless communication apparatus to a content providing system, and receiving and displaying, by the user terminal, content corresponding to the identification information from the content providing system.

BACKGROUND ART

Conventionally, various methods of providing content using a wireless communication apparatus have been proposed. A method of providing content based on a location of a wireless communication apparatus, a method of forwarding content among a plurality of terminals, and the like have been mainly provided.

For example, a method of providing location-based content by using a wireless Internet is disclosed in Korean Patent Publication No. 2006-0081570. The method may include providing a wireless access point (WAP) gateway with subscriber information of a mobile terminal and location information on a location in which the mobile terminal is connected to the wireless Internet, when the mobile terminal is connected to the wireless Internet; B) recording, in the WAP gateway, content information corresponding to the subscriber information and the location information when the mobile terminal receives content through the wireless Internet; C) extracting the subscriber information, the location information and the content information recorded in the WAP gateway and performing learning to accumulatively record the content information based on the location information during a predetermined period of time; and D) generating a recommended list based on a result of the learning, and adding a list of content extracted from a content providing server the recommended list based on content information.

Additionally, a wireless communication terminal and a data download method thereof are disclosed in Korean Patent Publication No. 2009-0082995. For example, through a peer-to-peer (P2P) scheme of a wireless mesh network, a part of requested content data may be individually downloaded in parallel from a plurality of other wireless communication terminals that are located adjacent to the wireless communication terminal. Accordingly, content data may be quickly downloaded.

However, recently, a wireless network is being increasingly utilized in a base station, a WAP, Bluetooth, and the like. Accordingly, there is a desire to provide content using the wireless network.

DISCLOSURE OF INVENTION

Technical Goals

An aspect of the present invention provides an apparatus and method for providing a user terminal located within a coverage area of a wireless communication apparatus, for example a base station, a wireless access point (WAP), a Bluetooth and the like, with identification information of the wireless communication apparatus, and with content corresponding to the identification information.

Another aspect of the present invention provides an apparatus and method for enlarging an opportunity to provide content by transferring, by a user terminal located within a coverage area of a wireless communication apparatus, identification information of the wireless communication apparatus to a neighboring terminal that is owned by a second user connected to a first user having the user terminal in a social network and that is not located within the coverage area.

Technical Solutions

According to an aspect of the present invention, there is provided a user terminal including: an identification information receiver to receive identification information of a wireless communication apparatus from the wireless communication apparatus, when the user terminal is located within a coverage area of the wireless communication apparatus; and a content display unit to receive at least one content corresponding to the identification information from a content providing system, and to display the received at least one content.

According to another aspect of the present invention, there is provided a content providing system including: a content search unit to search for content based on identification information of a wireless communication apparatus that is received from a user terminal; and a content providing unit to provide the user terminal with the found content.

According to another aspect of the present invention, there is provided a content display method including: receiving identification information of a wireless communication apparatus from the wireless communication apparatus, when a user terminal is located within a coverage area of the wireless communication apparatus; and receiving at least one content corresponding to the identification information from a content providing system, and displaying the received at least one content.

According to another aspect of the present invention, there is provided a content providing method including: searching for content based on identification information of a wireless communication apparatus that is received from a user terminal; and providing the user terminal with the found content.

Effects of the Invention

According to embodiments of the present invention, by providing content to a user terminal provided with identification information of a wireless communication apparatus, the wireless communication apparatus may operate as a content distribution intermediary and accordingly, it is possible to more effectively distribute content.

Additionally, according to embodiments of the present invention, content may be provided to a user terminal located within a coverage area of a wireless communication apparatus as well as to a neighboring terminal that is located outside the coverage area and that is owned by a user connected to a user having the user terminal in a social network and accordingly, it is possible to increase a number of times content is provided.

BEST MODE FOR CARRYING OUT THE INVENTION

The following detailed description is provided in order to explain the example embodiments by referring to the figures.

Figure 1:
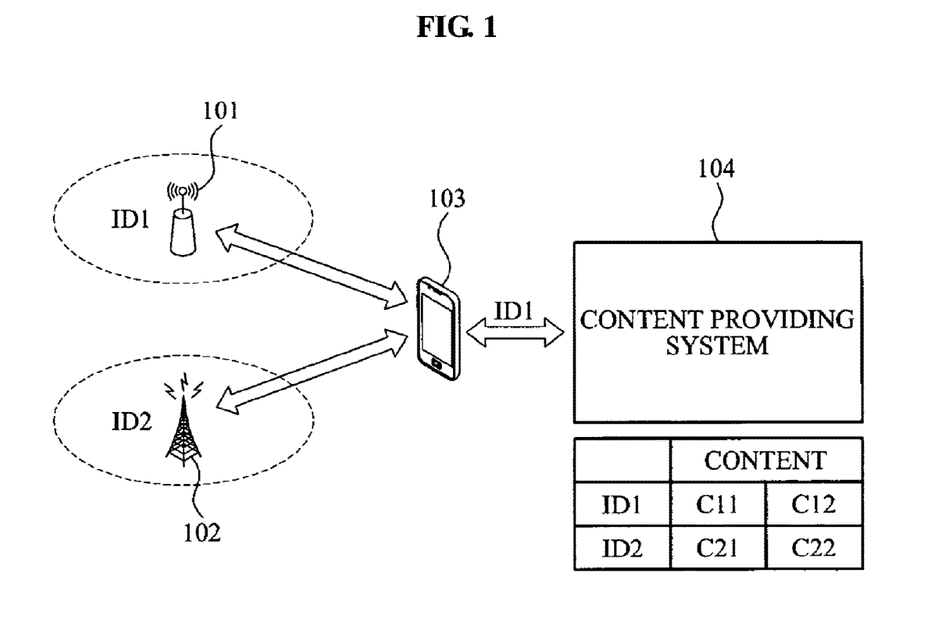
FIG. 1 is a diagram illustrating an operation of providing content based on identification information of a wireless communication apparatus according to an embodiment of the present invention.

FIG. 1 is a diagram illustrating an operation of providing content based on identification information of a wireless communication apparatus according to an embodiment of the present invention.

FIG. 1 illustrates wireless communication apparatuses 101 and 102, a user terminal 103, and a content providing system 104.

A user having the user terminal 103 may be located in a coverage area of the wireless communication apparatus 101 or 102. The wireless communication apparatuses 101 and 102 may include apparatuses used in a remote wireless network or a wireless local area network (WLAN), for example, a base station, a relay station, a wireless access point (WAP), a Bluetooth receiver, a radio frequency identification (RFID) reader, a digital multimedia broadcasting (DMB) transmitter, and the like. According to an embodiment of the present invention, the wireless communication apparatuses 101 and 102 may include all apparatuses available in a wireless network. Additionally, the user terminal 103 may be a terminal enabling data transmission via a wireless network, for example, a mobile phone, a smartphone, a personal digital assistant (PDA), a smartpad, and the like.

Additionally, the user having the user terminal 103 may be located in a common coverage area of the wireless communication apparatuses 101 and 102. In this example, the user terminal 103 may select the wireless communication apparatus 101 or 102. In FIG. 1, the wireless communication apparatus 101 may be assumed to be selected.

When the wireless communication apparatus 101 is selected, the wireless communication apparatus 101 may transmit identification information ID1 of the wireless communication apparatus 101 to the user terminal 103. The user terminal 103 may transfer the received identification information ID1 to the content providing system 104. The user terminal 103 may receive at least one content corresponding to the identification information ID1 of the wireless communication apparatus 101 from the content providing system 104. The identification information ID1 of the wireless communication apparatus 101 may refer to a beacon.

For example, when a WAP is used as a wireless communication apparatus, identification information of the WAP may be a service set identifier (SSID) and a wired equivalent privacy (WEP) key. Additionally, when a base station or a relay station is used as a wireless communication apparatus, identification information of the base station or the relay station may be a cell ID (CID) associated with a coverage. Additionally, identification information of a wireless communication apparatus may be, for example, a media access control (MAC) address.

When the identification information ID1 is received by the user terminal 103 from the wireless communication apparatus 101, the user terminal 103 may receive content C11 and C12 corresponding to the identification information ID1 from the content providing system 104. Types of content may include, for example, audio or video, however, there is no limitation thereto. Content may desirably be utilized by a content provider registered in the wireless communication apparatuses 101 and 102 for random distribution, or utilized by an advertiser for exposure of advertisement.

Hereinafter, embodiments of providing content between the user terminal 103 and the content providing system 104 will be described. However, the present invention may be utilized by various schemes, instead of being limited to the embodiments.

Embodiment 1

The user terminal 103 may sense the wireless communication apparatus 101 located around the user terminal 103. The wireless communication apparatus 101 may provide a wireless fidelity (Wi-Fi), that is, a WLAN.

When the wireless communication apparatus 101 is sensed, the user terminal 103 may transmit an SSID of the wireless communication apparatus 101 to the content providing system 104. The content providing system 104 may search for content associated with the SSID received from the user terminal 103, and may transmit the found content to the user terminal 103.

The content associated with the SSID may include, for example, marketing information associated with a shop in which the wireless communication apparatus 101 is installed, and may be transmitted to the user terminal 103. The marketing information may include, for example, promotion information, a coupon, a menu, an event, and the like. For example, the content associated with the SSID may be transmitted in the form of a messenger message that may be received by a messenger installed in the user terminal 103. In this example, the user having the user terminal 103 may open a messenger message received by the user terminal 103 from the content providing system 104, and may read the marketing information associated with the shop in which the wireless communication apparatus 101 is installed.

Embodiment 2

The user terminal 103 may sense the wireless communication apparatus 101 located around the user terminal 103. The wireless communication apparatus 101 may provide near field communication (NFC), for example, Bluetooth. When the wireless communication apparatus 101 is sensed, the user terminal 103 may transmit a name of the wireless communication apparatus 101 to the content providing system 104.

The content providing system 104 may search for content associated with the name, and may transmit a link of the content to the user terminal 103. The content may include, for example, video multimedia content, and audio multimedia content. When the user terminal 103 requests the content by accessing the link, the content providing system 104 may transmit the content in the form of a file, or a stream. The user may read the content transmitted through the user terminal 103.

Embodiment 3

The user terminal 103 may sense the wireless communication apparatus 101 located around the user terminal 103. The wireless communication apparatus 101 may provide a Wi-Fi, that is, a WLAN.

The user terminal 103 may transmit an SSID of the wireless communication apparatus 101 and an identification number of the user terminal 103 to the content providing system 104. The identification number may be, for example, a phone number of the user terminal 103. The content providing system 104 may search for content associated with the received SSID based on the SSID. The content providing system 104 may transmit the found content or a link of the content via a messaging service, for example a short message service (SMS) and a multimedia messaging service (MMS). The user terminal 103 may receive a message, and may read content. Additionally, the user terminal 103 may request content stored in the content providing system 104, via a link of content included in the message, and may receive the content in the form of a file or a stream.

Figure 2:
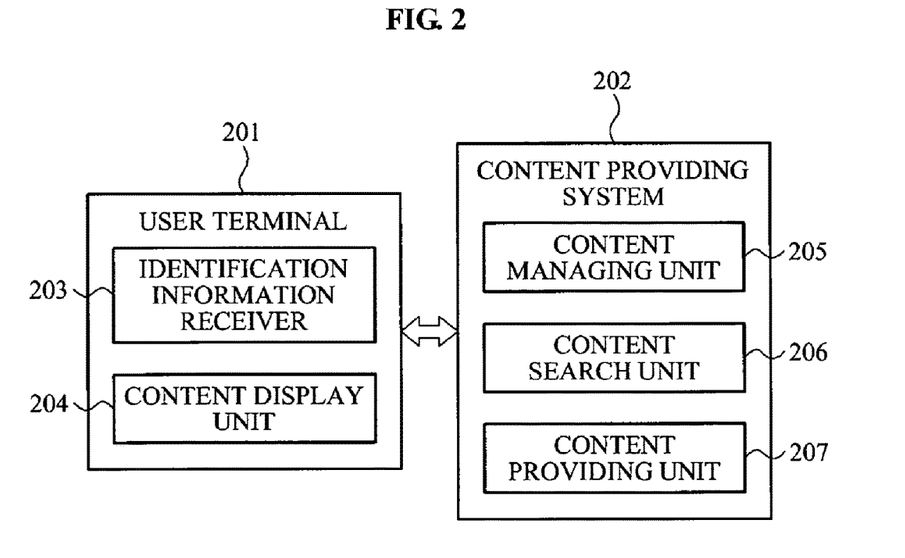
FIG. 2 is a block diagram illustrating a configuration of each of a user terminal and a content providing system according to an embodiment of the present invention.

FIG. 2 is a block diagram illustrating a configuration of each of a user terminal 201 and a content providing system 202 according to an embodiment of the present invention.

Referring to FIG. 2, the user terminal 201 may include an identification information receiver 203, and a content display unit 204. The content providing system 202 may include a content managing unit 205, a content search unit 206, and a content providing unit 207.

The identification information receiver 203 may receive identification information of a wireless communication apparatus from the wireless communication apparatus, when the user terminal 201 is located within a coverage area of the wireless communication apparatus.

For example, the identification information receiver 203 may receive identification information of a wireless communication apparatus selected by the user terminal 201 from among a plurality of wireless communication apparatuses, from the selected wireless communication apparatus. In this example, sensitivity of each of the plurality of wireless communication apparatuses may be equal to or greater than sensitivity that is set in advance based on a distance between the wireless communication apparatus and the user terminal 201, and the identification information receiver 203 may receive the identification information of the wireless communication apparatus selected from among the plurality of wireless communication apparatuses.

The identification information receiver 203 may transfer the received identification information to a neighboring terminal that is not located within the coverage area of the wireless communication apparatus. The neighboring terminal may receive content from the content providing system 202 based on the identification information, despite not being within the coverage area of the wireless communication apparatus.

The identification information receiver 203 may also transfer the received identification information to a neighboring terminal of a second user connected to a first user having the user terminal 201 in a social network. For example, when the first user and the second user are connected to each other in the social network, for example, a blog, a community, and a microblog, the identification information receiver 203 may transfer the identification information of the wireless communication apparatus to the neighboring terminal of the second user. The identification information of the wireless communication apparatus may be expanded via personal connections on the social network and accordingly, content may be provided to the other users connected on the social network.

The content display unit 204 may receive at least one content corresponding to the identification information from the content providing system 202, and may display the received content. For example, the content display unit 204 may control display of at least one content, based on location information of a wireless communication apparatus corresponding to a coverage area in which the user terminal 201 is located.

For example, the user terminal 201 may be located near the wireless communication apparatus, or in a boundary of the coverage area of the wireless communication apparatus, despite being located within the coverage area of the wireless communication apparatus.

When a distance between the user terminal 201 and the wireless communication apparatus decreases, the content display unit 204 may display content directly related to a location of the wireless communication apparatus with priority. When the distance between the user terminal 201 and the wireless communication apparatus increases, the content display unit 204 may randomly display at least one content corresponding to the identification information.

The content managing unit 205 may store and manage the at least one content. For example, the content managing unit 205 may store the at least one content and the identification information in the form of a lookup table.

The content search unit 206 may search for content based on identification information of a wireless communication apparatus that is received from the user terminal 201. The user terminal 201 may be located within a coverage area of the wireless communication apparatus.

The content search unit 206 may receive, from a neighboring terminal, a identification information of a wireless communication apparatus transferred by the user terminal 201 within a coverage area of the wireless communication apparatus, and may search for content.

Additionally, the content search unit 206 may receive identification information of a wireless communication apparatus from a neighboring terminal, and may search for content. A first user having the user terminal 201 within a coverage area of the wireless communication apparatus, and a second user having the neighboring terminal may be connected to each other in a social network.

The content providing unit 207 may provide the user terminal 201 with content corresponding to the identification information of the wireless communication apparatus. The user terminal 201 may control display of at least one received content based on location information of the wireless communication apparatus.

Figure 3:
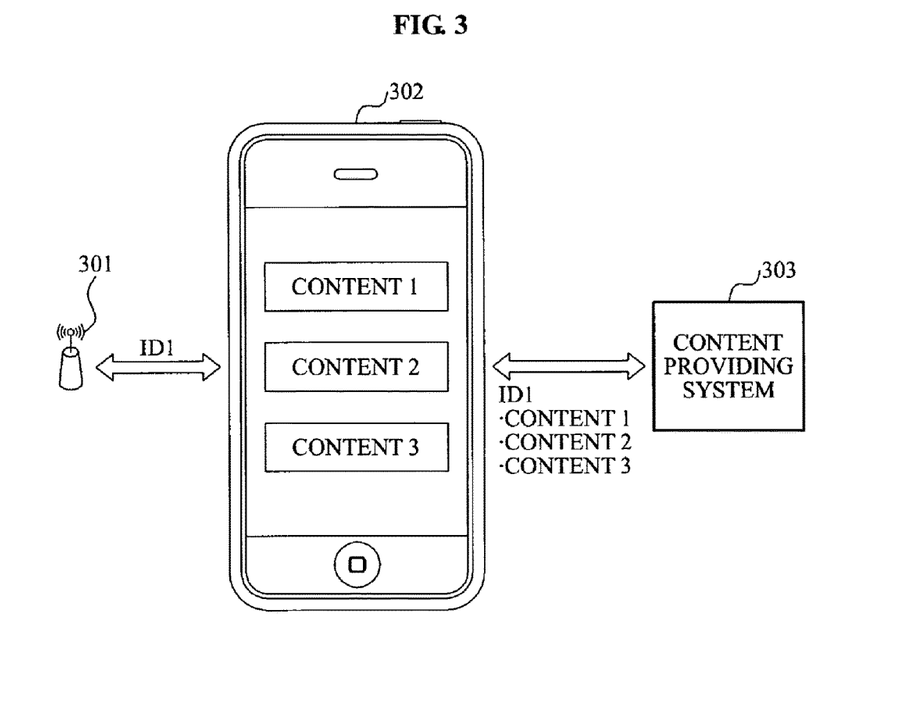
FIG. 3 is a diagram illustrating an operation of controlling display of content according to an embodiment of the present invention.

FIG. 3 is a diagram illustrating an operation of controlling display of content according to an embodiment of the present invention.

In FIG. 3, a user terminal 302 may be assumed to be located within a coverage area of a wireless communication apparatus 301. A signal sensitivity of the wireless communication apparatus 301 may be equal to or greater than a predetermined level based on a distance between the wireless communication apparatus 301 and the user terminal 302.

When the user terminal 302 is located within the coverage area, the user terminal 302 may receive identification information ID1 of the wireless communication apparatus 301 from the wireless communication apparatus 301. The user terminal 302 may transfer the identification information ID1 to a content providing system 303. The content providing system 303 may provide the user terminal 302 with contents 1, 2 and 3 corresponding to the identification information ID1.

The user terminal 302 may display the contents 1, 2 and 3 corresponding to the identification information ID1 on a display. An order of the contents 1, 2 and 3 may be changed based on location information of the wireless communication apparatus 301. For example, when the user terminal 302 is located near the wireless communication apparatus, the user terminal 302 may preferentially display content directly associated with location information of the wireless communication apparatus. When the user terminal 302 is located far away from a wireless communication apparatus, within a coverage area of the wireless communication apparatus, the user terminal 302 may randomly display the contents 1, 2 and 3 corresponding to the identification information ID1.

Figure 4:
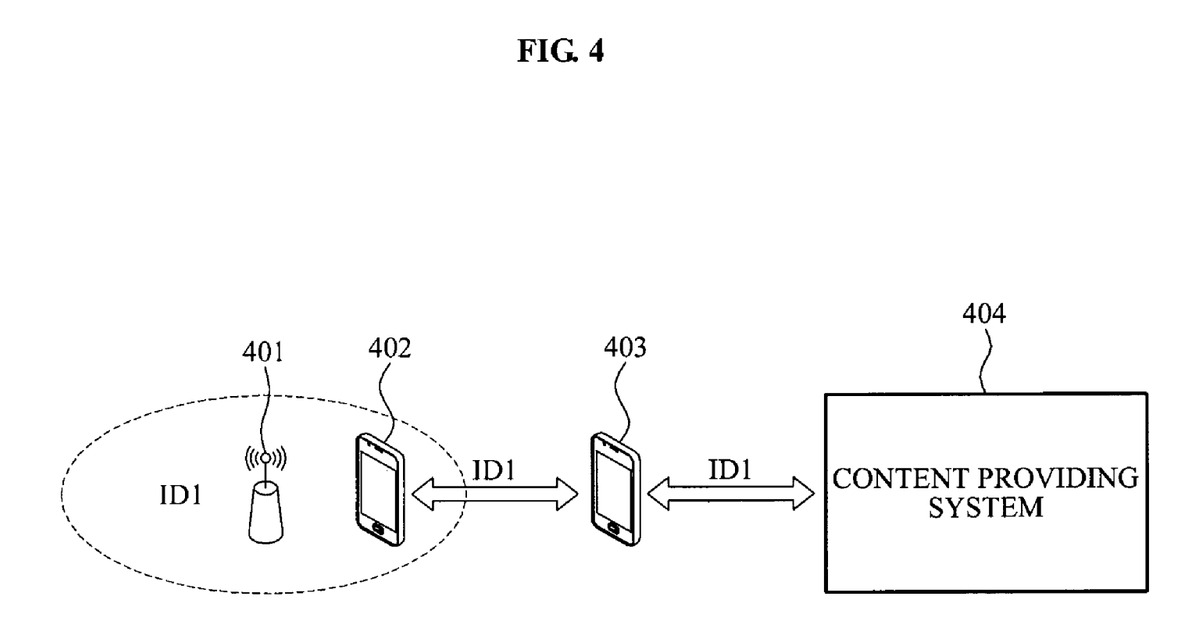
FIG. 4 is a diagram illustrating an operation of providing content to a neighboring terminal of a user in personal connections of a social network according to an embodiment of the present invention.

FIG. 4 is a diagram illustrating an operation of providing content to a neighboring terminal of a user in personal connections of a social network according to an embodiment of the present invention.

In FIG. 4, a user terminal 402 may be located within a coverage area of a wireless communication apparatus 401. The wireless communication apparatus 401 may transfer identification information ID1 of the wireless communication apparatus 401 to the user terminal 402.

The user terminal 402 may transfer the identification information ID1 to a neighboring terminal 403 outside the coverage area of the wireless communication apparatus 401. For example, a first user having the user terminal 402 and a second user having the neighboring terminal 403 may be connected to each other in a social network, and the user terminal 402 may transfer the identification information ID1 to the neighboring terminal 403.

The neighboring terminal 403 may receive the identification information ID1 from the user terminal 402, may transfer the identification information ID1 to a content providing system 404, and may receive at least one content corresponding to the identification information ID1 from the content providing system 404.

Figure 5:
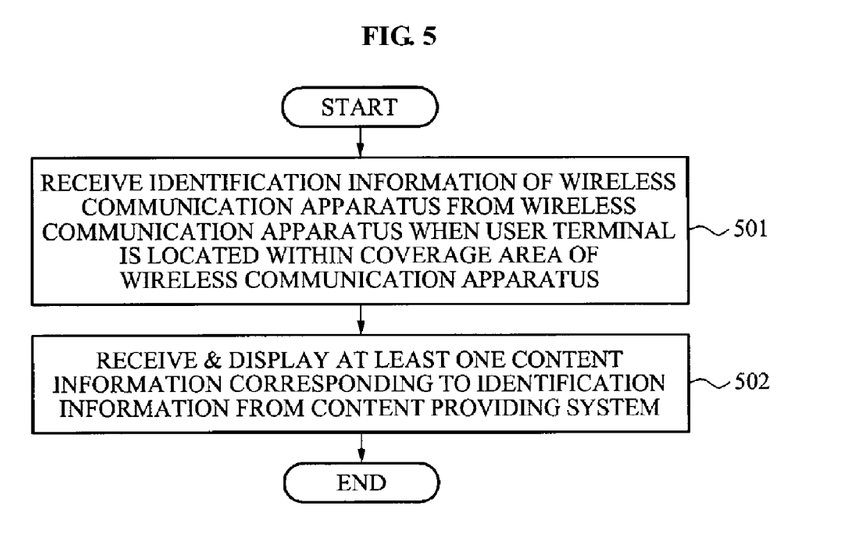
FIG. 5 is a flowchart illustrating a content display method according to an embodiment of the present invention.

FIG. 5 is a flowchart illustrating a content display method according to an embodiment of the present invention.

Referring to FIG. 5, in operation 501, a user terminal may receive identification information of a wireless communication apparatus from the wireless communication apparatus, when the user terminal is located within a coverage area of the wireless communication apparatus.

For example, the user terminal may receive identification information from a wireless communication apparatus selected by the user terminal from among a plurality of wireless communication apparatuses. In this example, signal sensitivity of each of the plurality of wireless communication apparatuses may be equal to or greater than signal sensitivity that is set in advance based on a distance between the wireless communication apparatus and the user terminal.

Additionally, the user terminal may transfer the identification information to a neighboring terminal that is not located within the coverage area of the wireless communication apparatus. A first user having the user terminal and a second user having the neighboring terminal may be connected to each other in a social network.

In operation 502, the user terminal may receive at least one content information corresponding to the identification information from a content providing system, and may display the received content information. The user terminal may control display of at least one received content based on location information of a wireless communication apparatus corresponding to a coverage area in which the user terminal is located.

Figure 6:
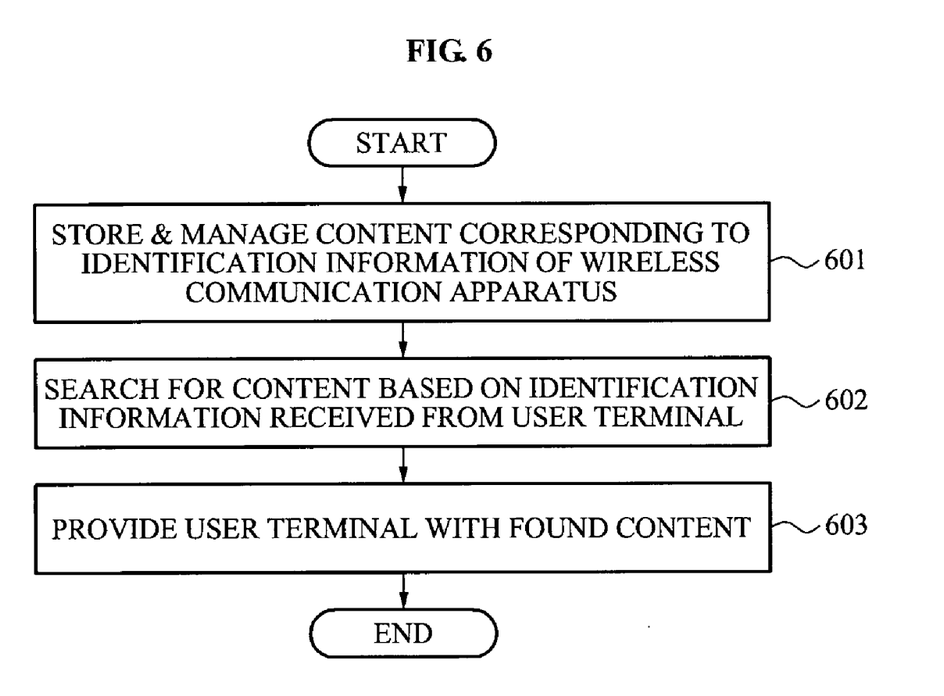
FIG. 6 is a flowchart illustrating a content providing method according to an embodiment of the present invention.

FIG. 6 is a flowchart illustrating a content providing method according to an embodiment of the present invention.

Referring to FIG. 6, in operation 601, a content providing system may store and manage content corresponding to identification information of a wireless communication apparatus.

In operation 602, the content providing system may search for content based on identification information of a wireless communication apparatus that is received from a user terminal. The user terminal may be located within a coverage area of the wireless communication apparatus.

In an example, the content providing system may receive, from a neighboring terminal, identification information of a wireless communication apparatus that is transferred by a user terminal located within a coverage area of the wireless communication apparatus, and may search for content. In another example, the content search unit 206 may receive identification information of a wireless communication apparatus from a neighboring terminal, and may search for content. In this example, a first user having a user terminal within a coverage area of the wireless communication apparatus, and a second user having the neighboring terminal may be connected to each other in a social network.

In operation 603, the content providing system may provide the user terminal with the found content. The user terminal may control display of at least one content received based on location information of the wireless communication apparatus.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A user terminal, comprising:
a processor configured to:
receive unidirectionally identification information of a wireless communication apparatus via one communication route from the wireless communication apparatus, when the user terminal is located within a coverage area of the wireless communication apparatus; and
transmit the identification information of the wireless communication apparatus to a content providing system via another communication route, and receive at least one content corresponding to the identification information of the wireless communication apparatus via another communication route from a content providing system,
when the user terminal is located in a common coverage area of a plurality of wireless communication apparatuses, wherein the content providing system provides content corresponding to the identification information of one wireless communication selected by the user terminal among the plurality of wireless communication apparatuses,
wherein the processor receives the at least one content directly from the content providing system, not through the wireless communication apparatus,
wherein the processor transmits the identification information to a neighboring terminal that is located outside the coverage area of the wireless communication apparatus, wherein the neighboring terminal is owned by a other user connected to a user of the user terminal in a social network,
wherein the neighboring terminal receives the content from the content providing system using the identification information received from the user terminal, regardless of the neighboring terminal not being within the coverage area of the wireless communication apparatus,
when a distance between the user terminal and the wireless communication apparatus decreases, the processor displays content directly related to a location of the wireless communication apparatus among contents corresponding to the identification information with priority,
when the distance between the user terminal and the wireless communication apparatus increases, the processor randomly displays contents corresponding to the identification information.

2. The user terminal of claim 1, wherein the processor receives identification information from the wireless communication apparatus selected from among a plurality of wireless communication apparatuses, each of the plurality of wireless communication apparatuses having a signal sensitivity that is equal to or greater than a preset signal sensitivity based on a distance between the user terminal and each of the wireless communication apparatuses.

3. A content providing system, comprising:
a processor configured to:
search for content based on identification information of a wireless communication apparatus that is received from a user terminal; and
provide the user terminal with the found content,
when the user terminal is located in a common coverage area of a plurality of wireless communication apparatuses, wherein the content providing system provides content corresponding to the identification information of one wireless communication selected by the user terminal among the plurality of wireless communication apparatuses,
wherein the user terminal receives the at least one content directly from the content providing system, not through the wireless communication apparatus,
wherein the wireless communication apparatus unidirectionally transmits the identification information to the user terminal via one communication route, and
wherein the user terminal transmits the identification information to the content providing system, and receives the content corresponding to the identification information via another communication route,
wherein the user terminal transmits the identification information to a neighboring terminal that is located outside the coverage area of the wireless communication apparatus, wherein the neighboring terminal is owned by a other user connected to a user of the user terminal in a social network and,
wherein the neighboring terminal receives the content from the content providing system using the identification information received from the user terminal, regardless of the neighboring terminal not being within the coverage area of the wireless communication apparatus,
when a distance between the user terminal and the wireless communication apparatus decreases, the processor displays content directly related to a location of the wireless communication apparatus among contents corresponding to the identification information with priority,
when the distance between the user terminal and the wireless communication apparatus increases, the processor randomly displays contents corresponding to the identification information.

4. The content providing system of claim 3, wherein the user terminal is located within a coverage area of the wireless communication apparatus.

5. The content providing system of claim 3, wherein the processor stores and manages content corresponding to the identification information.

6. A content display method performed by a user terminal, comprising:
receiving unidirectionally identification information of a wireless communication apparatus from the wireless communication apparatus via one communication route, when the user terminal is located within a coverage area of the wireless communication apparatus;
transmitting the identification information of the wireless communication apparatus to a content providing system via another communication route; and
receiving at least one content corresponding to the identification information via another communication route from a content providing system, and
displaying the received content,
when the user terminal is located in a common coverage area of a plurality of wireless communication apparatuses, wherein the content providing system provides content corresponding to the identification information of one wireless communication selected by the user terminal among the plurality of wireless communication apparatuses,
wherein the user terminal receives the at least one content directly from the content providing system, not through the wireless communication apparatus, wherein the user terminal transmits the identification information to a neighboring terminal that is located outside the coverage area of the wireless communication apparatus, wherein the neighboring terminal is owned by a other user connected to a user of the user terminal in a social network, wherein the neighboring terminal receives the content from the content providing system using the identification information received from the user terminal, regardless of the neighboring terminal not being within the coverage area of the wireless communication apparatus, when a distance between the user terminal and the wireless communication apparatus decreases, the processor displays content directly related to a location of the wireless communication apparatus among contents corresponding to the identification information with priority, when the distance between the user terminal and the wireless communication apparatus increases, the processor randomly displays contents corresponding to the identification information.

7. A content providing method performed by a content providing system, comprising:

searching for content based on identification information of a wireless communication apparatus that is received from a user terminal; and providing the user terminal with the found content, when the user terminal is located in a common coverage area of a plurality of wireless communication apparatuses, wherein the content providing system provides content corresponding to the identification information of one wireless communication selected by the user terminal among the plurality of wireless communication apparatuses, wherein the user terminal receives the at least one content directly from the content providing system, not through the wireless communication apparatus, wherein the wireless communication apparatus unidirectionally transmits the identification information to the user terminal via one communication route, and wherein the user terminal transmits the identification information to the content providing system, and receives the content corresponding to the identification information via another communication route, wherein the user terminal transmits the identification information to a neighboring terminal that is located outside the coverage area of the wireless communication apparatus, wherein the neighboring terminal is owned by a other user connected to a user of the user terminal in a social network, wherein the neighboring terminal receives the content from the content providing system using the identification information received from the user terminal, regardless of the neighboring terminal not being within the coverage area of the wireless communication apparatus, when a distance between the user terminal and the wireless communication apparatus decreases, the processor displays content directly related to a location of the wireless communication apparatus among contents corresponding to the identification information with priority, when the distance between the user terminal and the wireless communication apparatus increases, the processor randomly displays contents corresponding to the identification information.

* * * * *